(No Model.)
3 Sheets—Sheet 2.
A. B. SCHERMERHORN.
ROTARY LAWN MOWER.
No. 515,795.
Patented Mar. 6, 1894.
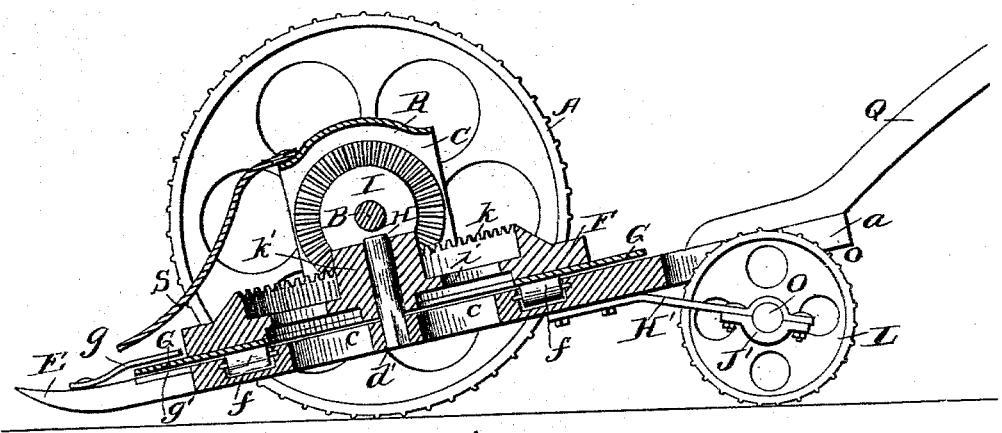
Fig. 3.
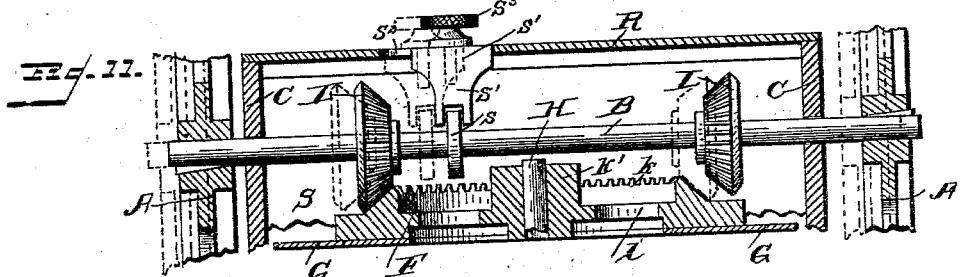
Fig. 11.
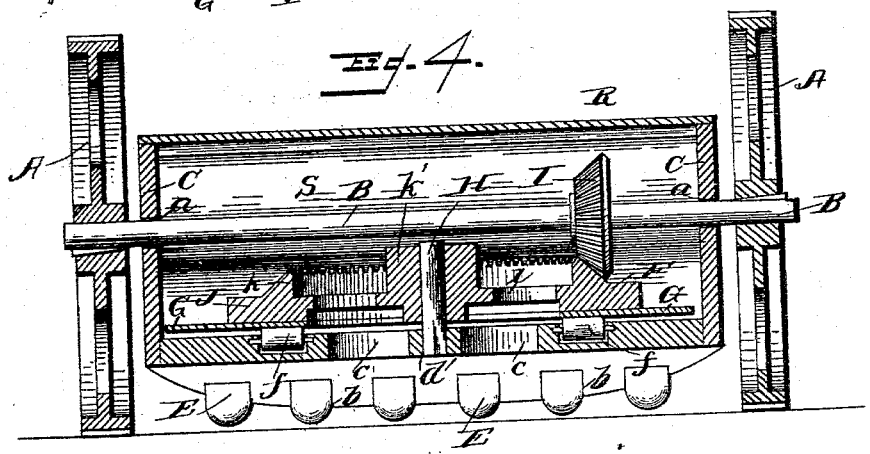
Fig. 4.
Fig. 12.
Witnesses
C. E. Hunt.
Alice F. Brooke.
Inventor
A. B. Schermerhorn
by J. R. Littell
his Attorney (No Model.) 3 Sheets—Sheet 3.
A. B. SCHERMERHORN.
ROTARY LAWN MOWER.
No. 515,795. Patented Mar. 6, 1894.
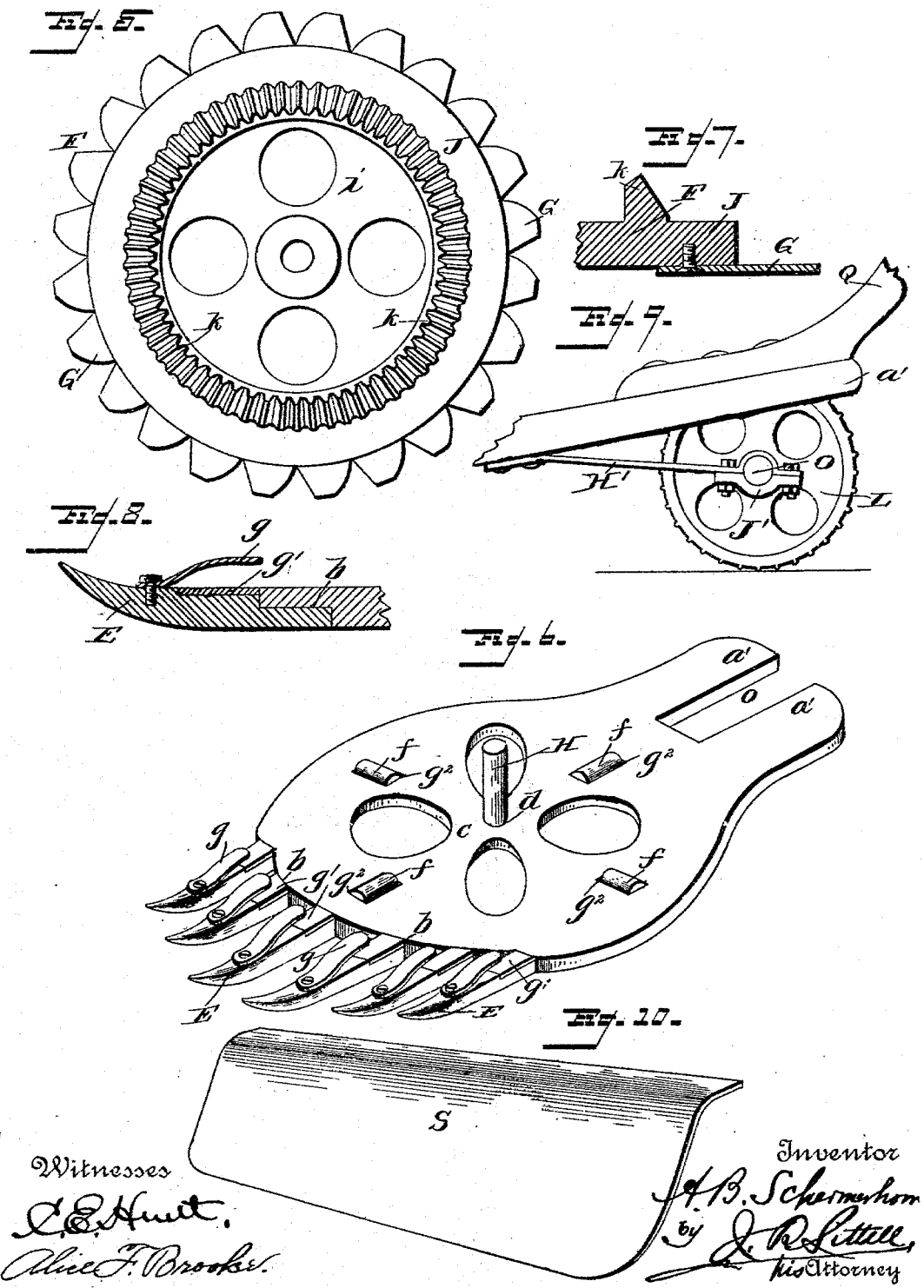
Witnesses
C. E. Hurt.
Alice F. Brooks.
Inventor
A. B. Schermerhorn
by J. R. Littell,
his Attorney

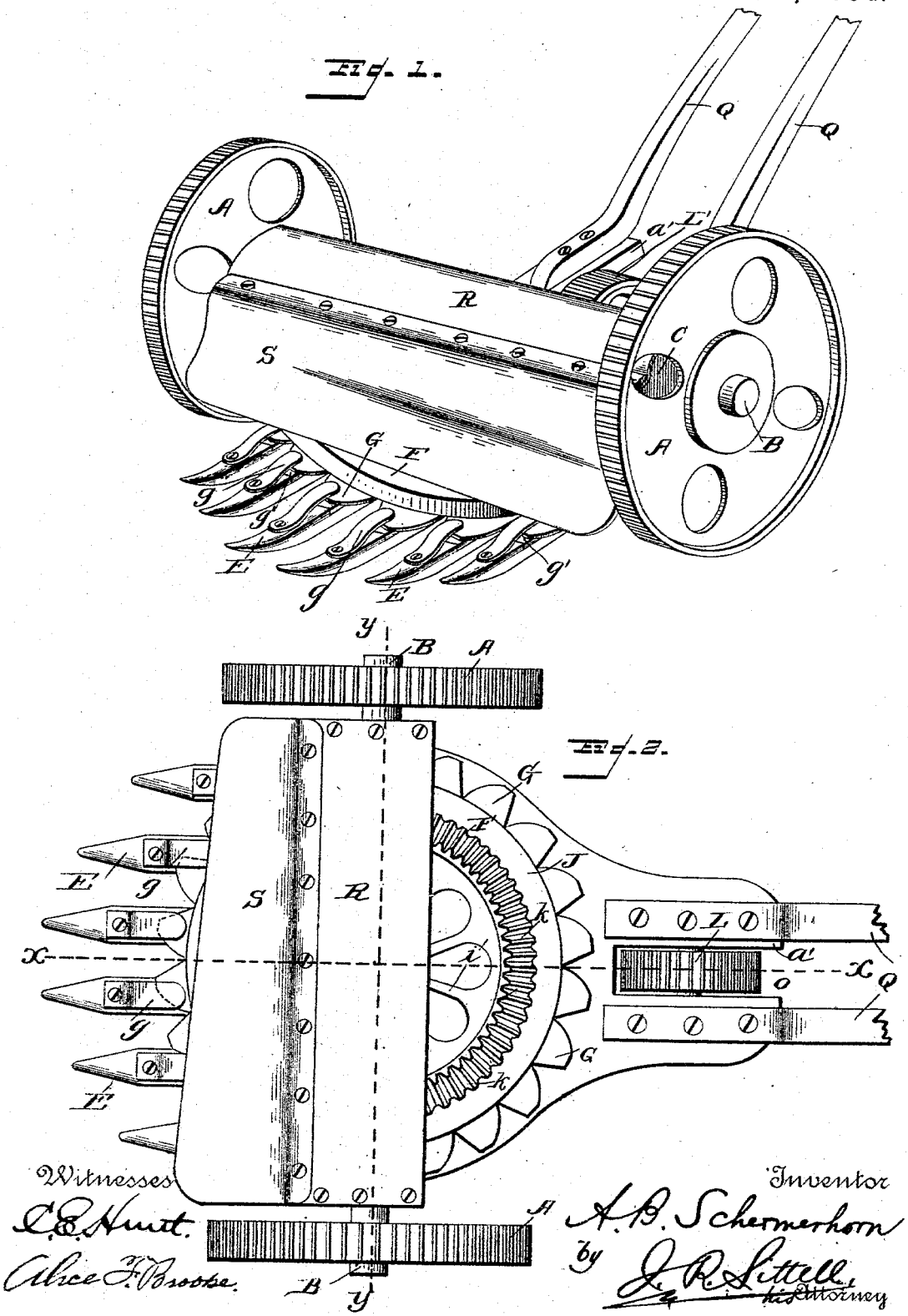

UNITED STATES PATENT OFFICE.

ALEXANDER B. SCHERMERHORN, OF ATHENS, PENNSYLVANIA.

ROTARY LAWN-MOWER.

SPECIFICATION forming part of Letters Patent No. 515,795, dated March 6, 1894.

Application filed February 4, 1893. Serial No. 461,035. (No model.)

*To all whom it may concern:*

Be it known that I, ALEXANDER B. SCHERMERHORN, a citizen of the United States, residing at Athens, in the county of Bradford and State of Pennsylvania, have invented a new and useful Rotary Lawn - Mower, of which the following is a specification.

My invention relates to a novel construction of lawn-mower in which a horizontally-disposed rotatable disk or wheel carrying radial peripheral cutters is utilized.

The object of my invention is to produce a machine of this class especially adapted for cutting high and dry grass; and moreover, to provide a simple, durable, and comparatively inexpensive device which will be found exceedingly efficient and serviceable for general usage.

For the attainment of these several objects, my invention comprises an improved organization of parts, and details of construction, all of which will be more fully described hereinafter, and the specific points of novelty in which will be pointed out by the appended claim.

Referring to the accompanying drawings forming a part of this specification:—Figure 1 is a perspective view of a complete lawn-mower constructed in accordance with my invention. Fig. 2 is a top plan view. Fig. 3 is a central longitudinal section on line $x$—$x$ of Fig. 2. Fig. 4 is a cross-section on line $y$—$y$ of Fig. 2. Fig. 5 is a detail plan view of the cutter wheel or disk. Fig. 6 is a detail perspective view of the bed-plate. Fig. 7 is a detail sectional view of one of the cutters, showing the manner of its attachment to the disk. Fig. 8 is a similar view of one of the guide-fingers on the front of the bed-plate. Fig. 9 is a detail side elevation showing the manner of rendering the trail-wheel vertically adjustable to vary the depth of the cut. Fig. 10 is a detail view of the grass guard. Fig. 11 is a sectional view illustrating a modification.
Fig. 12 is a detail view of the cover plate and the devices for longitudinally adjusting the main axle.

Like letters of reference mark the same or corresponding parts in the several views of the drawings.

Referring to Figs. 1, and 3, A designates the ground-wheels of the machine, of usual construction, and of the desired shape and dimensions. If desired, the tread of the ground-wheels can be roughened similar to ordinary traction-wheels to insure their trend upon the ground-surface. These wheels are keyed to the main horizontal axle, B, which, in turn, is journaled through two upwardly projecting vertical bearing-lugs, C C, attached to or formed integral with the bed-plate, and provided with journal openings, $a$ $a$, for the main-axle. The bed-plate is made of suitable metal, cast or otherwise formed, and is substantially disk-shaped corresponding to the outline of the super-incumbent cutter-wheel. This bed-plate is preferably cast in one piece with an integrally-formed rearwardly extending bifurcated extension, $a'$, on its rear edge, as shown; and is in skeleton form having a curved rim to which the fingers are attached, and a central web, $c$, provided with a circular aperture, $d$, to receive the king-pin or pivot bolt of the cutter wheel. The front edge of the bed-plate is provided with a series of spaced recesses, $b$ $b$, of the required size and depth to receive and accommodate the projecting tapered fingers, E E, spaced equal distances apart and occupying a segmental portion of the front portion of the bed-plate. Each finger, E, is bolted or otherwise secured to the bed-plate in a recess, $b$, and is provided on its upper side with a guard-latch, $g$, bolted at its rear end to the upper side of the tooth or finger and extending rearwardly and upwardly leaving an intervening space through which the cutters of the cutter wheel can pass. Any form or construction of guard-latch can be utilized without departing from my invention. At the rear end of each finger E is a metallic cutter plate, $g'$, secured to the finger E. Thus, underneath the cutting knives is a series of co-operating cutters or plates, $g'$ $g'$, over which the knives pass in their rotary movement.

The cutter-disk or wheel, F, is approximately similar in size and shape to the bed-plate, and parallel and co-extensive therewith. It consists of the rim, J, and the web, $i$. Around the outer edge of the rim is bolted the series of cutters, G G, spaced equal distances apart in a common horizontal plane, and arranged in a radial and serial manner around the edge of the disk. On the upper side of the cutter wheel near the edge is formed a circumferential annular flange, $k$, projecting upwardly from the face of the wheel and having bevel-teeth formed therearound, thus constituting a circular bevel-gear. The under side of the rim, J, is smooth as shown, and bears upon anti-friction rollers, $ff$, journaled suitably in countersunk recesses, $g^2 g^2$, placed at suitable points in the upper face of the bed-plate. By this construction the friction between the moving cutter-wheel and the stationary bed-plate is effectually prevented.

H designates the king or pivot bolt passing through coincident openings in the center of the cutter-wheel and bed-plate, and forming the axis of rotation for the cutter-wheel.

Each cutter-knife, G, is substantially an irregular triangle in shape, with one curved side and one straight side, as shown; and by this construction an approximately V-shaped recess is provided between any two adjacent cutters.

The cutter-wheel is preferably cast in one piece of metal and its central web is provided with an upwardly extending vertical boss or collar, $k'$, having a central vertical bore through which the king-pivot passes. On the main axle is keyed a bevel-pinion, I, designed to engage and intermesh with the bevel gear of the cutter-wheel; thus the rotary motion given the axle by the travel of the ground-wheels is communicated to the cutter-wheel.

As shown in Figs. 3 and 9, on the under side of the extension, $a'$, are two parallel spring-metal plates or arms, H' H', bolted at their inner ends to the bed-plate, and extending rearwardly and downwardly, their free extremities severally carrying stirrup-bearing-boxes, J' J', bolted to the ends of the plates. In these boxes is journaled the shaft, O, of the trail wheel, L, which has a segmental portion of its tread projecting up through the slot, $o$, in the extension, $a'$. The plates or arms, H' H', are elastic yet strong enough to hold the wheel in a set plane normally, but when pressure is exerted by the operator the rear end of the frame is depressed against the tension of the spring arms carrying the trail wheel. By this construction the trail wheel can be vertically adjusted to elevate or lower the front edge of the cutter wheel to vary the depth of the cut of the machine according to the demands of operation. Instead of this form of adjustment, I can employ any means for varying the depth of the cut without deviating from the spirit of my invention.

Q Q, are the handles of the machine bolted at their lower forward ends to the extension, $a'$, one handle on either side of the slot, $o$, and their other ends are connected and braced by the usual cross-piece. By attaching the handles to the extension, $a'$, the operator can readily exert the necessary downward pressure to depress the trail wheel when desired. When other means than that shown are employed for depressing or elevating the trail-wheel, the handles can be attached to any other portion of the machine, if preferred.

Transversely across the top of the machine is secured a cover-plate, R, made of sheet-metal and attached at each extremity to the top edge of a bearing lug, C; and to the front edge of this cover-plate is fastened a curved deflecting shield or guard, S, also made of sheet metal, and extending in an oblique manner down over the front portion of the machine and terminating close to the upper surface of the front of the cutter-wheel. By the provision of this shield the cut grass is deflected off, and the dust and dirt are prevented from entering and clogging the machine.

Owing to the peculiar shape and construction of the cutter-knives, their horizontal play, the projecting guide-fingers, and the means for varying the depth of the cut, both high and low grass will be cut with equal facility, and the dry grass usually left standing by other forms of mowers will be severed as well as that having greater body and resistance.

To provide a reversible motion in the cutter disk or wheel F, a pinion, I', corresponding to the pinion I may be arranged near the end of the main axle on the opposite side of the machine and adapted to intermesh with the gear of the cutter-wheel. Thus, the pinion I or the pinion I' may be respectively thrown into gear with the gear of the cutter-wheel, by means of suitable mechanism, so that the cutter-wheel will turn either to the right or left as may be desired or be most effective with relation to the particular character of grass to be cut.

The shifting of the pinions I and I' respectively into engagement with the gear of the cutter-wheel may be effected by means of any well-known or adapted mechanism, for instance: the main axle may have a longitudinal adjustment by means of a circumferential flange, $s$, engaged by a clutch, $s'$, projecting upwardly through a longitudinally disposed slot, $s^2$ in the cover-plate R and longitudinally adjustable therein by means of a set screw, $s^3$, this construction being illustrated in Fig. 12 of the drawings and the main construction for carrying out the reversible movement being shown in the modification illustrated in Fig. 11 of the drawings. In lieu of this set screw adjustment, it will be understood that any other well-known or adapted adjusting means, such as a lever, may be employed for carrying the clutch $s'$. In connection with this form of construction involving a reversible movement, the cutter knives G will be provided with a cutting edge at both sides, and thus form a V-shaped recess between each pair of cutters, and the cutter-plates $g'$ will also be provided with a cutting edge at each side.

I prefer to construct the fingers E of steel, and it will be noted that their general construction and arrangement is peculiarly adapted for an even and close cut, the outer ends of the fingers being upwardly curved, as shown, and rounded or beveled on their under sides.

I do not wish to be understood as limiting myself specifically to the exact construction and arrangement of parts herein shown and specified, as various manifest modifications, especially in the operating gear between the main axle and cutter-wheel, may be resorted to without departing from the spirit and scope of my invention, for instance: a central gearing may be provided in lieu of the segmental gearing herein shown. I therefore reserve the right to all such variations and modifications in construction as properly fall within the spirit and scope of my invention and the terms of the appended claim.

Having thus fully described my invention, what I claim, and desire to secure by Letters Patent, is—

In a lawn mower of the class described, the combination, with the ground-wheels; main axle; and bevel pinion; of the bed-plate having bearing supports for the main-axle; an extension on the rear of the bed-plate; anti-friction rollers journaled in recesses on the top face of the bed-plate; a cutter disk superposed upon the bed-plate and having a gear on its upper surface intermeshing with the bevel pinion; cutter knives radially disposed around the edge of the cutter-disk; guide-fingers secured to the front edge of the bed-plate and projecting forwardly therefrom; and a vertically movable trail wheel supported by the extension of the bed-plate, substantially as specified.

In testimony whereof I affix my signature in presence of two witnesses.

ALEXANDER B. SCHERMERHORN.

Witnesses:
R. N. LOWE,
S. A. HINES.